Feb. 23, 1926.
G. J. PEZOLD
1,574,409
FILTER
Filed Dec. 19, 1923  3 Sheets-Sheet 2
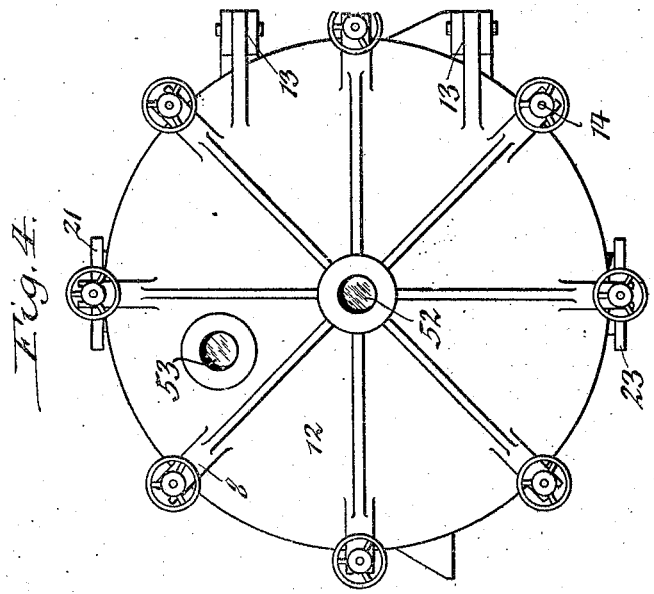
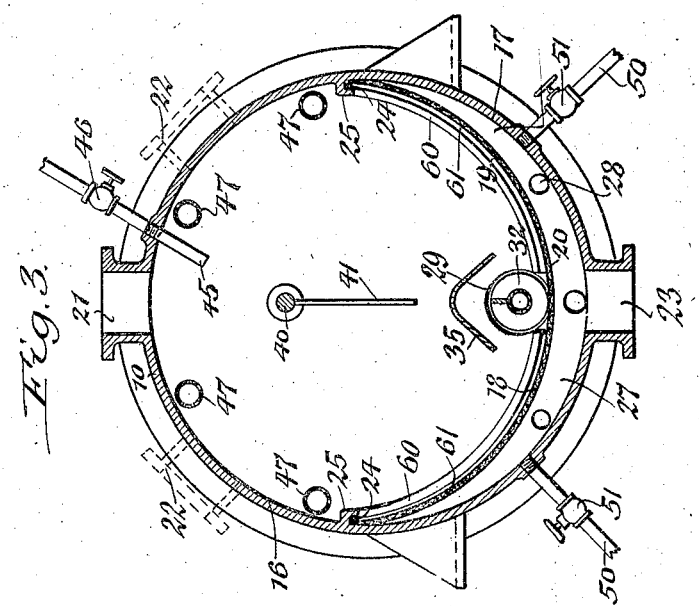
Inventor
George J. Pezold
by Popp & Powers
Attorneys.

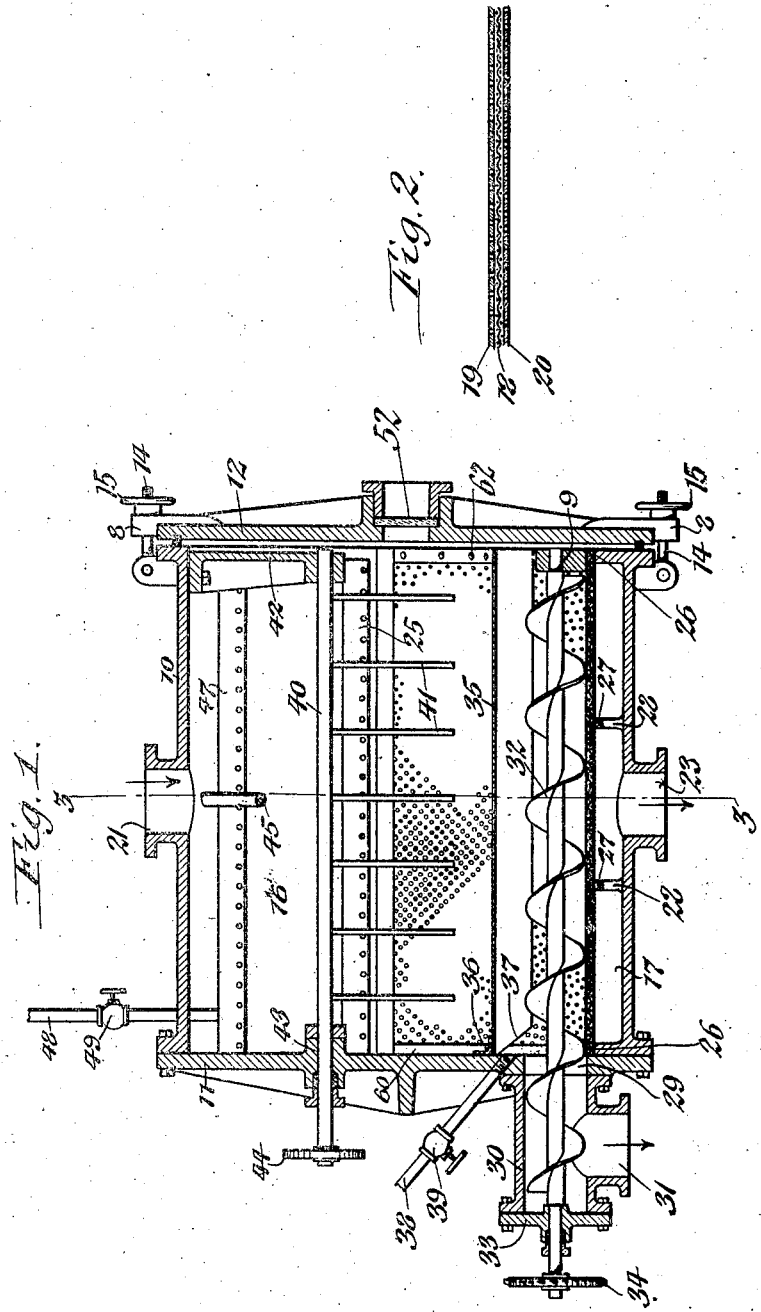

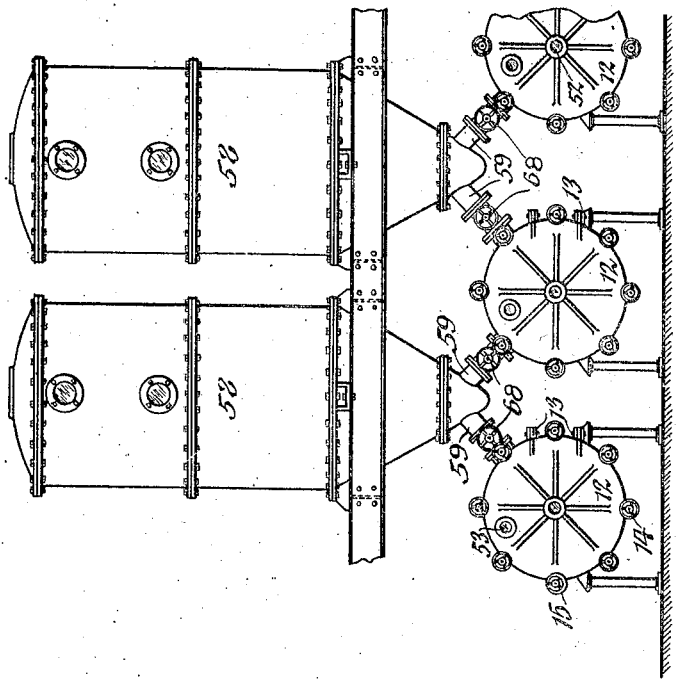
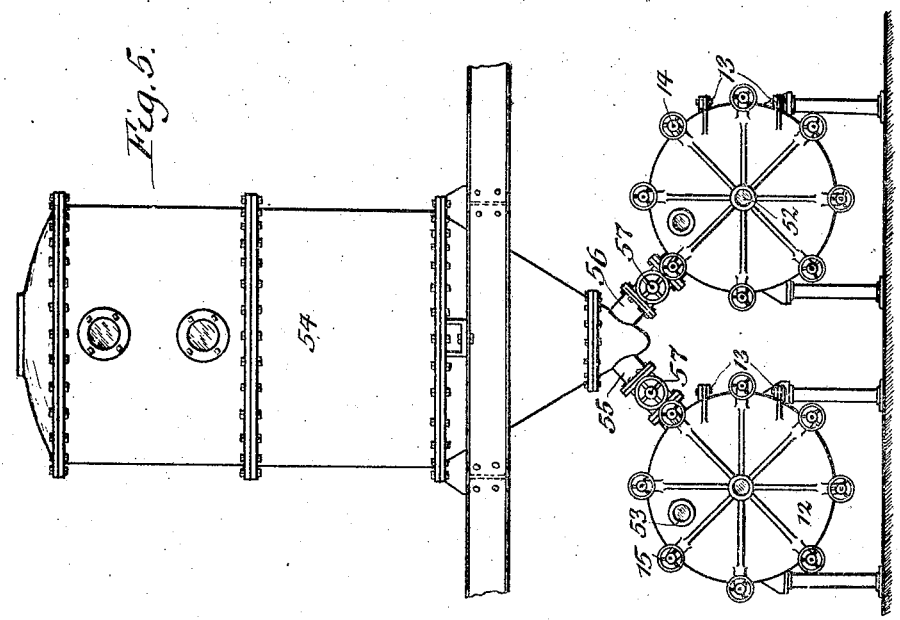

Patented Feb. 23, 1926.

1,574,409

UNITED STATES PATENT OFFICE.

GEORGE J. PEZOLD, OF BUFFALO, NEW YORK.

FILTER.

Application filed December 19, 1923. Serial No. 681,460.

*To all whom it may concern:*

Be it known that I, GEORGE J. PEZOLD, a citizen of the United States, residing at Buffalo, in the county of Erie and State of New York, have invented new and useful Improvements in Filters, of which the following is a specification.

This invention relates to a filter which is more particularly designed for use in connection with evaporators for the purpose of separating crystals or solids from the liquid which contains these materials although the same may be also used to advantage in other installations where it is desired to separate crystals or solids from liquids and the like.

This invention has for its objects to increase the efficiency of the operation of filtration and to increase the speed whereby this function is performed; also to expedite the discharge of the filtered liquid and the solid material which has been separated therefrom; also to reduce the manual labor attending the operation of the filter; also to render the various parts of the filter easily accessible for the purpose of facilitating and expediting the removal and replacement of the filter screen and the parts within the enclosing casing of the filter; and also to permit of readily and thoroughly washing the solids in the liquid which is to be filtered and to facilitate the dissolving of the solids or the crystals contained in the liquid, if this is necessary.

With these objects in view, my invention consists in the general organization of the filter hereinafter described which represents a practical embodiment of my invention, it being understood, however, that variations and changes may be made in the same without departing from the spirit of the invention and as defined in the scope of the appended claims.

In the accompanying drawings:

Figure 1 is a vertical longitudinal section of a filter embodying my improvements. Figure 2 is a fragmentary longitudinal section of a portion of the preferred form of screen employed in this filter. Figure 3 is a vertical transverse section taken on line 3—3, Figure 1. Figure 4 is an end view of the filter taken from that end of the enclosing casing or housing which is opened when access to the interior of the casing or housing is desired. Figure 5 is an elevation showing two of my improved filters shown in connection with a single effect evaporator. Figure 6 is a similar view showing three of my improved filters with a double effect evaporator.

Similar characters of reference refer to like parts in the several views.

The shell, housing or enclosing casing of my improved filter may be variously constructed, but in the form shown in the drawings, as an example, the same comprises a central cylindrical body 10, which has its axis arranged horizontally, a fixed head 11 permanently secured to one end of the body, and a removable head 12 which is adapted to be moved toward and from the opposite end of the body for the purpose of opening or closing the same and permitting access to the interior of the shell when this is required. The removable head may be mounted for this purpose in any suitable manner, but in the preferred form this head is connected adjacent to one of its edges by means of hinges 13 with the body of this filter so that the same can be swung horizontally into an open or closed position and this head is clamped in its closed position by means of swing bolts 14 pivoted at different points on the periphery of the filter body and provided with clamping nuts 15 which engage with lugs 8 on the edge of the movable head, as shown in Figures 1 and 4.

The interior of this housing or shell is divided by means of a screen or foraminous partition into an upper receiving chamber 16 which is adapted to receive the liquid to be filtered and a lower delivery chamber 17 which is adapted to receive the filtered liquid from which the solids have been removed by the intervention of the screen. This screen in its preferred form comprises a central or intermediate layer 18 of woven wire and perforated sheets of metal 19, and 20 arranged on opposite sides of the woven wire layer, as shown on an enlarged scale in Figure 2. The mesh of the woven wire layer is of a small size which is determined by the character of the solids which are to be removed from the liquid, while the perforations of the upper and lower plates of metal 19 and 20 are somewhat larger so as to permit the liquid to flow to and from the woven wire layer and still form a strong and reliable support for the latter, which on account of the small mesh is usually comparatively weak.

The liquid containing solids may be introduced into the receiving chamber 16 in any suitable manner but preferably through an inlet opening 21 which may be arranged either on top of the central part of the body 10, as shown by full lines in Figures 1 and 3, or the top of this body may be provided with two of such inlets on opposite sides of the central part, as shown by dotted lines 22 in Figure 3. The liquid from which the solids have been removed through the medium of the screen is discharged from the delivery chamber 17 through an outlet 23 which is preferably arranged centrally on the lowermost part of the body 10, as shown in Figures 1 and 3, although other means of disposing of this filtered liquid may be provided if desired.

The filtering screen is preferably so mounted in the enclosing shell so as to present a maximum filtering area and allow the maximum filtering capacity and also to permit of easily and conveniently removing this filtering element when this becomes necessary for the purpose of inspection, cleaning or repairing. To accomplish this purpose the screen is generally constructed in the form of a downwardly dished or curved partition, the axis of which is arranged horizontally or parallel with the axis of the body 10 and the longitudinal edges of this screen being engaged with the underside of downwardly projecting longitudinal hook-shaped flanges 25, arranged on horizontally opposite parts of the inner side of the body and a tight joint being formed between these edges of the screen and these hooks by packing 24 inserted between the inner side of these hooks and the adjacent part of the screen, as shown in Figure 1. The rear transverse edge of the screen is similarly joined to the adjacent rear wall or head of the shell so as to form a separation between the receiving chamber 16 and the delivery chamber 17 by extending the rear edge of the screen under flanges 60 on the fixed wall or head and inserting packing 61 therebetween. In the preferred construction the opposite transverse edges of the screen rest with thin undersides upon crescent shaped ribs 26 formed internally on the lower part of the body at opposite ends thereof, the front edge of the screen being secured to the front rib 26 by screens 62, if desired. The tightness of the joints between this screen and its supports may be effected by other suitable fastenings. Intermediate of its length the screen is supported on its underside by additional supporting ribs 27 of crescent shape form which project upwardly from the bottom part of the body 10 into engagement with the underside of the screen on opposite sides of the outlet 23, these supplemental ribs 27 being provided with openings or passages 28 so as to provide free intercommunication between the spaces on the underside of this screen which form the delivery chamber 17 and permit the filtered liquid to pass out freely from all parts thereof through the discharge or outlet 23.

By means of this construction of the screen a larger filtering area is produced than if the same were of flat form and by thus mounting this screen in the shell, the same can be readily removed from the shell after opening up the removable head 12 and thus permit of easy inspection, cleaning and repairing of this screen whenever this becomes necessary or desirable.

After the liquid which is laden with solids enters the receiving chamber 16, the liquid passes downwardly through the screen into the delivery chamber 17 while the solids are held back by the screen and accumulate on the upper side of the same. These solids are removed preferably by means which are operated intermittingly and in the preferred construction these solids are removed through the solids outlet 29 which is arranged in the fixed head 11 of the filter shell on a line with the upper side of the lowermost part of the screen.

This solids outlet opening 29 opens into a discharge tube 30 secured to the adjacent part of the head 11 and provided on its underside with the discharge or solids outlet 31. Extending lengthwise along the upper side of the lowermost part of the screen and through the solids outlet 29 and the discharge tube 30 is a conveyer 32 which is preferably of the rotary screw type so that upon turning the screw in the proper direction, the solids which have been separated from the liquid and lie on top of the lowermost part of the screen will be carried away therefrom into the conveyer tube 30 and to the outlet tube of the latter. The shaft of this screw conveyer is journaled in a bearing 9 at the inner end of the screen and a bearing 33 arranged at the outer end of the conveyer tube 30 and power may be applied to this conveyer shaft in any suitable manner, for instance, by means of a sprocket 34 which is secured to the outer end of the conveyer shaft and adapted to receive a chain belt which is operated from any suitable source.

In order to prevent the solids from accumulating on top of the conveyer unduly and permit of starting the latter easily a deflector or guard 35 is provided which is arranged lengthwise over the top of the conveyer and supported at that end which is next to the removable head 12 by mounting the same on the adjacent conveyer shaft bearing 9 while that end of the deflector which is arranged next to the fixed head 11 is suspended from the latter at a point above the discharge opening 29 by means of a bracket 36, as shown in Figure 1. This guard or deflector is constructed of A-shape in cross section, as shown in Figure 3, so that the solids deposited upon the upper side thereof will slide downwardly therefrom along opposite sides of the conveyer and eventually flow to the underside of the latter and be carried thereby from the upperside of the screen through the solids outlet 29 and through the tube 30 to the exterior of the machine.

In the preferred construction that end of the deflector 35 next to the stationary head 11 and the solids outlet 29 is cut back or has parts thereof terminating short of this head, as shown at 37 in Figure 1, for the purpose of permitting the solids which are deposited on the adjacent part of the screen to flow with greater freedom downwardly toward the conveyer instead of being permitted to accumulate at this point and produce an uneven operation of the filter as well as possibly clogging or interfering with the uniform operation of the conveyer.

If the character of the material which is being filtered should at any time tend to pile up in front of the solids outlet 29 and obstruct the free escape of the solids therethrough, this may be remedied by introducing a jet of steam or other fluid into the space within the shell immediately adjacent to the solids outlet 29 for which purpose the clearing pipe 38 is provided which is secured in the head 11 so as to permit of directing a bit of steam into the locality just mentioned, this steam being controlled by means of a valve 39 arranged in this pipe.

In order to break up the solid material in the upper part of the receiving chamber and facilitate its pasage to the conveyer so that the latter can carry it away an agitator is provided which, in the preferred construction, comprises a horizontal shaft 40 arranged lengthwise above the deflector and provided with a plurality of laterally projecting arms or tines 41. Upon rocking this shaft, the arms thereof will sweep transversely back and forth across the space immediately above the deflector and cause any solids resting thereon to be stirred up or disturbed to such an extent that they will flow downwardly from the deflector within reach of the conveyer so that they will be carried away.

This shaft 40 may be mounted in any suitable manner, but in the preferred form the inner end of this shaft which is next to the removable head 12 of the shell is journaled in a hanger 42 which depends from the adjacent part of the top of the shell, while the opposite end of this shaft passes through a bearing 43 formed in the stationary head 11 and is provided externally of the shell with a wheel 44 which may be turned either by hand or by power by any suitable or approved means.

As the filtering operation progresses the solid material is liable to accumulate in the form of a cone in the upper part of the receiving chamber immediately below the inlet 21 and in order to prevent such accumulation, means are provided for clearing this space which means preferably consist of a nozzle 45 projecting through the upper part of the body 10 into the interior thereof at a point immediately below the inlet 21, so that steam, air or other fluid under pressure may be directed into this space and dislodge or carry away any solids which would have a tendency to accumulate, this pipe or nozzle being provided with a valve 46 externally of the shell so as to permit of controlling the fluid pasing through this pipe and to use the same whenever it is necessary.

For the purpose of enabling this filter to be used in treating various kinds of materials means are provided to permit of steaming, washing or drying the solids while the same are within the receiving chamber of the filter. For this purpose a plurality of spray pipes 47 are arranged horizontally and lengthwise along the inner side of the upper part of the body 10 at different points circumferentially thereof which pipes are adapted to deliver sprays of air, steam, water or gas into the mass of solids within the receiving chamber of a filter for the purpose of treating this material as desired. By introducing water through these spray pipes the solids may be washed and upon thereafter introducing air or steam the same may be dried. If the character of the material requires it, the same can also be heated by the introduction of steam through the spray pipe 47 and solids may also be treated for certain purposes by introducing a gas of any desired character into the receiving chamber through the perforated pipes 47. The introduction of air, steam, water or gas into these spray pipes may be effected by providing each of them with a supply pipe 48 which contains a valve 49 whereby the passage of the particular agent into the spray pipes may be controlled as required.

For the purpose of permitting the filtering screen or surfaces to be cleaned, means are provided for directing steam against the underside of the same. This in the present instance is accomplished by the provision of two steam supply pipes 50 which connect with the lower part of the body 10 on opposite sides of the lowermost part of the same so that steam may be directed by these pipes against the underside of the screen and thus remove any material which may be clogging the same, each of these pipes being provided with a valve 51 for controlling the supply or passage of steam therethrough. In order to permit the attendant to illuminate the interior of the filter and observe the quantity of solids which have accumulated therein the movable head 12 is provided with two sight glasses 52, 53 preferably arranged one above the other so that the attendant can hold a light at one glass and look into the receiving chamber through the other.

This filter may be coupled up with other apparatus in various ways depending upon the particular character of the material for which the filter is being used, for instance, in Figure 5 two filters constructed in accordance with my invention are used in connection with a single effect evaporator 54 from the lower or outlet end of which the material to be filtered may be discharged, either into one or the other of the two filters by means of two branch pipes 55, 56 each of which contains a controlling valve 57, while in Figure 6 three filters constructed in accordance with my invention are used in connection with a double effect evaporator, each unit 58 of which is provided with branch outlet pipes 59 at its lower end which are controlled by valves 68 so that the product of each of these evaporator units may be discharged into one or the other of two filters, this particular organization being so designed that either unit of the double effect evaporator may discharge into a central filter or into a filter arranged at the one side of the central filter.

My improved filter is particularly advantageous in the employment of a curved filtering surface inasmuch as this gives greater strength to the filtering area and provides a shorter path through which the liquid travels to the filtering surface and consequently produces a much faster circulation and a quicker filtering action than has been possible in the old type of filters which employ a flat filtering surface.

Furthermore, this construction of a filter permits of greatly increasing the speed of discharge of the liquid from the filter when the same is ready to unload, inasmuch as the path of travel of the liquid through the solids to the filtering surface is shortened materially. Moreover, the speed of discharging the solid material is materially increased because the large hinged door permits of quick and easy access to the interior of the filter when the discharge of this solid material must be effected by hand instead of by mechanical means. If the solid material does not move in the conveyer this can be readily accomplished by opening the movable head 12 of the filter and breaking up the material manually so that the same will reach the conveyer.

This large door at one end of the filter shell has the further advantage that it provides a free and full access to the entire interior of the filter and facilitates as well as expedites the removal and replacement of the filtering surface and other internal parts when necessary. By arranging the cylindrical body of the shell horizontally, this permits a better arrangement of the equipment which is usually employed in connection with the filter such as pumps or other auxiliaries and simplifies the connections therewith.

By the employment of the spray pipes and the novel arrangement of the same within the upper part of the filter shell, it is possible to effect a better and more thorough washing, treating and steaming of the solids if this should be necessary in the operation of any processes involving materials which would require such treatment.

I claim as my invention:

1. A filter comprising an enclosing shell having the form of a horizontal cylinder and provided on its upper side with an inlet for the liquid to be filtered and on its underside with an outlet for the filtered liquid, the interior of said shell being provided with a screen which is curved downwardly on an axis arranged parallel with the axis of the shell and which divides the interior thereof into an upper chamber for the liquid to be filtered and a lower delivery chamber for the filtered liquid, and one end of said shell being provided with an outlet for the solids removed from said liquid and arranged on a line with the upper side of the lowermost part of said screen, a screw conveyer arranged over the lowermost part of said screen and adapted to carry the solids therefrom through said solids outlet and an A-shaped deflector arranged lengthwise above said conveyer and having that end thereof adjacent to said solids outlet cut away to form clearance passages for the solids between said deflector and the adjacent wall of the shell.

2. A filter comprising an enclosing shell having the form of a horizontal cylinder and provided on its upper side with an inlet for the liquid to be filtered and on its underside with an outlet for the filtered liquid, the interior of said shell being provided with a screen which is curved downwardly on an axis arranged parallel with the axis of the shell and which divides the interior thereof into an upper chamber for the liquid to be filtered and a lower delivery chamber for the filtered liquid and one end of said shell being provided with an outlet for the solids removed from said liquid and arranged on a line with the upper side of the lowermost part of said screen, a screw conveyer arranged over the lowermost part of said screen and adapted to carry the solids therefrom through said solids outlet, a deflector arranged above said conveyer and an agitator arranged above said deflector and comprising a horizontal shaft arranged lengthwise of the shell and extending with one end through one wall of said shell and journaled at its other end in an internal hanger depending from the top of the shell and provided with a plurality of laterally projecting arms.

3. A filter comprising an enclosing shell which is divided internally by a downwardly dished screen forming an upper receiving chamber and a lower delivery chamber, said receiving chamber having an inlet for the liquid to be filtered and said delivery chamber being provided with an outlet for the filtered liquid and said receiving chamber being also provided with an outlet for the solids which are separated from the liquid, a conveyer for carrying the separated solids from the top of said screen through said solids outlet and means for directing a clearing fluid into the solids adjacent to said solids outlet.

4. A filter comprising an enclosing shell which is divided internally by a downwardly dished screen forming an upper receiving chamber and a lower delivery chamber, said receiving chamber having an inlet for the liquid to be filtered and said delivery chamber being provided with an outlet for the filtered liquid and said receiving chamber being also provided with an outlet for the solids which are separated from the liquid, a conveyer for carrying the separated solids from the top of said screen through said solids outlet, a deflector arranged over said conveyer, and a pipe for conducting a jet of clearing fluid into the solids adjacent to said solids outlet.

5. A filter comprising a shell provided on opposite sides of its interior with longitudinal flanges having the form of downwardly projecting hooks and having a removable head at one end, and a downwardly dished screen having its longitudinal edges engaging underneath said hook flanges and movable into and out of that end of the shell which is normally closed by said removable head.

6. A filter comprising a closed shell, a trough shaped screen arranged within the shell and dividing the same into an upper receiving chamber and a lower delivery chamber, said shell having an inlet in its upper part for supplying to said receiving chamber the solids containing liquid to be filtered, an outlet in its bottom for discharging the clear liquid from the delivery chamber, and an outlet in an end wall immediately above the lowermost part of said screen for discharging the solids which have been separated from the solids containing liquid, and a conveyer for propelling the solids from the lowermost part of said screen through said solids outlet which conveyer is separated by an intervening space from the top of said receiving chamber and operates on the solids only in the lower part of said receiving chamber.

GEORGE J. PEZOLD.